Patented Aug. 19, 1930

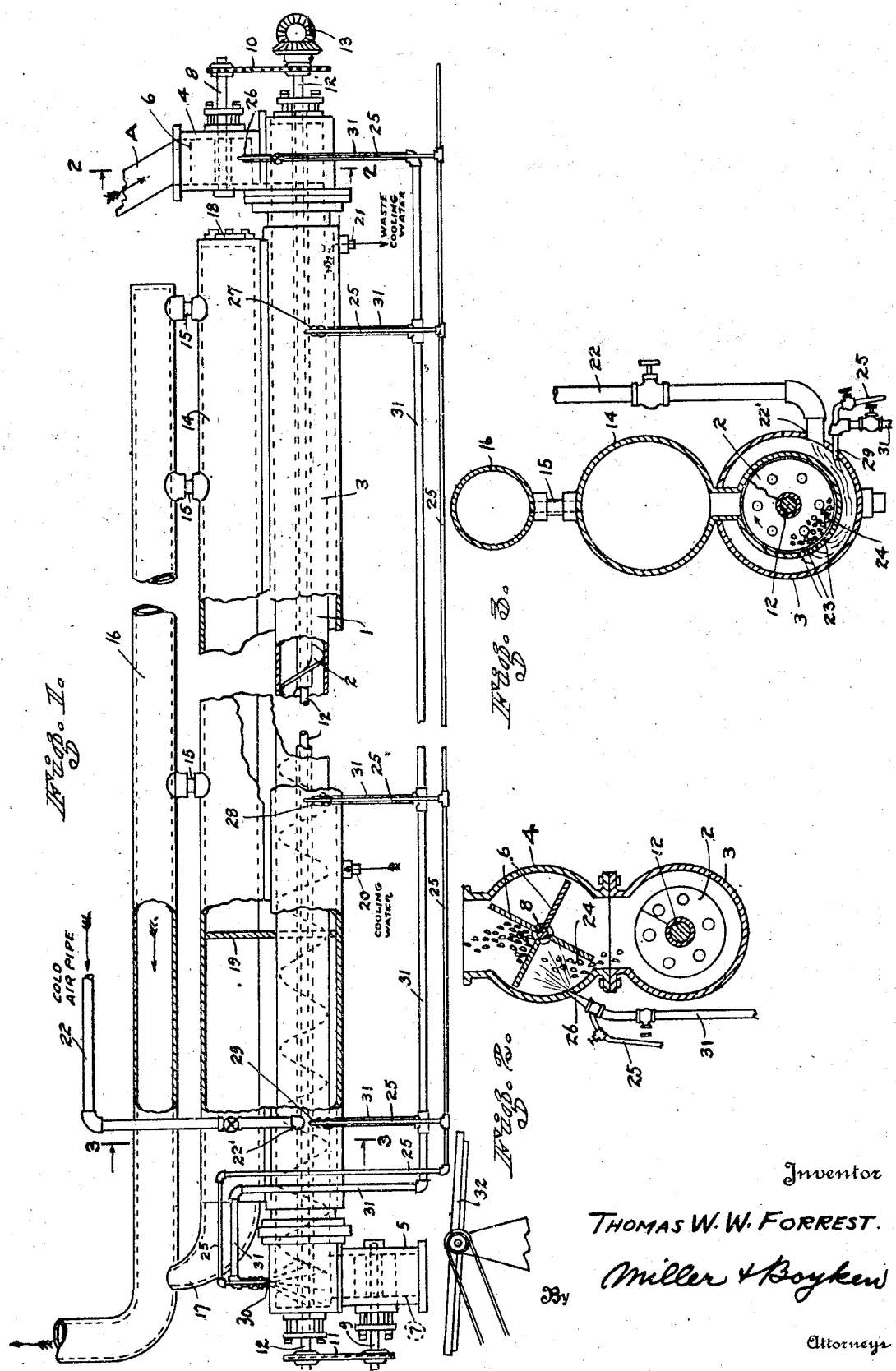

1,773,425

UNITED STATES PATENT OFFICE

THOMAS W. W. FORREST, OF FRESNO, CALIFORNIA, ASSIGNOR TO SUN-MAID RAISIN GROWERS OF CALIFORNIA, OF FRESNO, CALIFORNIA, A COOPERATIVE ASSOCIATION OF CALIFORNIA

DRIED-FRUIT TREATMENT

Application filed November 24, 1925. Serial No. 71,176.

This invention relates to the treatment of dried fruits, especially raisins, in conditioning the fruit preparatory to packing in boxes, cartons, etc., and the invention forms improvements on my "process for treating fruits especially raisins," as described in my copending application for patent filed June 17, 1925, under Serial No. 37,676, issued as Patent No. 1,711,729.

In the process described in my copending application mentioned one of the features consisted in subjecting the heat treated and seeded hot raisins to controlled cooling in a chamber which was divided into zones and in which zones the fruit was subjected to different rates of cooling while also subjected to an oil treatment.

The improvements hereunder have to do with this controlled cooling and oil application and the invention has as its object more effective use of the oil and also a better product.

In the drawings hereto only the portions of the apparatus for carrying out the controlled cooling of the fruit is shown, and is substantially as shown in my copending case referred to but with the improvements added.

Figure 1 is a side elevation of the controlled cooling chamber broken to show its inner construction and to bring it within the drawing sheet, Figure 2 is an enlarged cross section of Figure 1 as seen from the line 2—2, and Figure 3 is an enlarged cross section of Figure 1 as seen from the line 3—3 thereof.

The chamber comprises a long inner cylinder or casing 1 traversed by a spiral conveyor 2 and surrounded by an outer cylinder or casing 3 spaced from the inner cylinder.

The hot seeded raisins are fed from a chute "A" to one end of the conveyor through a revolving gate 4 and are delivered from the other end through a similar gate 5 to a shaker table 32.

The gates 4 and 5 are of the well known rotary type having vanes 6 and 7 respectively fitting within the gate housing and mounted on shafts 8 and 9 respectively chain or gear driven as at 10 and 11 respectively to the ends of the conveyer shaft 12 so as to be positively actuated therewith upon driving the conveyor through means of any suitable drive such as indicated at 13.

Along the upper edge of the conveyor housing extends an exhaust flume 14 opening into the inner or conveyor cylinder 1 as shown in Figure 3 and communicating at intervals as at 15 with an exhaust pipe 16, and also at the end at 17, while the opposite end of the flue is provided with an air inlet control gate 18 for starting a draft through the flume upon applying a suction to the pipe 16.

A transverse wall 19 divides the chamber and flume into two zones, the first one being relatively long for gentle precooling of the fruit through means of a water jacket maintained in the intercylinder space through pipes 20 and 21, and the second zone relatively short where cold air or other refrigerant gas is applied through a pipe 22 for expansion directly within the fruit being carried along by the conveyor, the gas or air passing through perforations 23 in the inner casing, through the fruit 24 banked up over the openings by the revolutions of the conveyor, and thence making its escape through the flume.

All the above is as described in my copending application and it is also contemplated that a perforated conveyor flight be used as indicated, also that an oil blast be admitted to the fruit and it is especially in connection with the oil blast that the improvements are effected.

Oil, of a harmless or edible nature, preferably an oil extracted from the seeds of the very fruit under treatment, is delivered through a pipe 25 to atomizing nozzles 26, 27, 28, 29 and 30, controlled by suitable valves and actuated by compressed air from a pipe 31.

Some of these nozzles are directed within the inner cylinder 1 as at 27 and 28 at desired intervals as in the earlier application, while one as at 26, best shown in Figure 2 is directed upwardly through the casing of gate 4 to eject a mist of oil through the fruit 24 falling from the gate to the conveyor and also impinging the walls of the vanes.

At the discharge end of the conveyor the nozzle 30 similarly ejects an oil mist through the raisins falling from the conveyor to the gate 5 and also against the walls of the gate vanes, and in the short final cooling zone of the apparatus one of the oil atomizers 29 is arranged just adjacent the cold air pipe inlet 22' in such a manner that the oil mist is carried with the cold air from pipe 22 through the perforations 23 and deposited directly within the raisins as they are chilled by the expansion of the compressed air coming through the perforations.

After the fruit is delivered to the shaker table 32 it may be packed or further air cooled and packed as desired.

The oil treatment of the raisins or other dried fruit as above described has been found much superior to the treatment as previously disclosed for two reasons, first that the application of the oil mist from nozzle 29 through the aid of air expanding through the perforations 23 prevents the raisins gumming themselves together at the initial cooling shock of the expanding refrigerant, and the final blast of atomized oil from nozzle 30 insures the raisin berries remaining permanently in a separated condition for free pouring, as well as lubricates the machine at this point.

Also, it should be noted that in order to insure a high quality of product it is necessary that the frictional sides of the gate vanes and the conveyor be kept oiled as well as the raisins, and the blast at 26 cares for the vanes of gate 4 as well as insuring a small quantity of atomized oil being carried into the receiving end of the conveyor, and the discharge gate 5 is oiled by the extra oil from blast nozzle 30 not absorbed by the raisins, while at intermediate points along the apparatus any number of nozzles 27 and 28 may be used as previously disclosed.

I claim:

1. The method of conditioning heated dried fruit which comprises passing the hot fruit through a cooling chamber and treating the fruit with an edible oil after it is discharged therefrom.

2. The method of conditioning heated dried fruit which comprises passing the hot fruit through a cooling chamber and treating the fruit with an edible oil after it is admitted and as it is discharged therefrom.

3. The method of conditioning heated dried fruit which comprises passing the hot fruit through a cooling chamber and of expanding a gas through the fruit, said gas carrying finely divided particles of an edible oil.

4. The method of conditioning heated dried fruit which comprises passing the hot fruit through a cooling chamber and of expanding air through the fruit, said air carrying finely divided particles of an edible oil.

5. The method of treating heated dried fruit such as raisins which includes directing a blast of atomized edible oil through the body of raisins.

6. The method of treating dried fruit which includes expanding compressed air within the fruit body, said air carrying finely divided particles of an edible oil.

7. The method of cooling hot dried fruit which includes expanding therebetween a mixture of an edible oil and air.

8. Apparatus for the treatment of dried fruit comprising a conveyor mounted in a casing, a feed gate at the receiving end of the conveyor and a discharge gate at the discharge end, and means arranged and adapted for blasting oil against the working faces of the gates.

9. Apparatus for the treatment of dried fruit comprising a conveyor for conveying the fruit, a gate at one end of the conveyor for controlling said fruit and an oil atomizer arranged and adapted for directing a blast of oil upon the gate.

10. Apparatus for the treatment of dried fruit comprising a conveyor for conveying the fruit, a gate at one end of the conveyor for controlling said fruit, and an oil atomizer arranged and adapted for directing a blast of oil upon the fruit while passing through the gate.

11. The method of cooling hot dried fruit which comprises condensing an edible oil within a body of the fruit.

12. The method of cooling hot dried fruit which comprises condensing an edible oil within a body of the fruit while drawing off the heat by suction.

13. The method of preventing hot raisins from gumming together upon cooling which comprises isolating the raisins on an oil film of an edible oil applied at the time of maximum cooling.

THOMAS W. W. FORREST.